Aug. 22, 1961 VAN WYKE H. HELTON 2,997,416
METHOD AND APPARATUS FOR REPAIRING WALLBOARD OR THE LIKE
Filed March 14, 1958 2 Sheets-Sheet 2
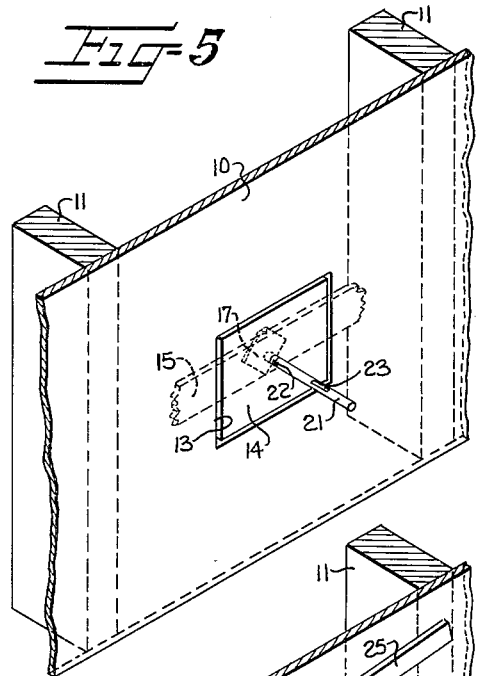
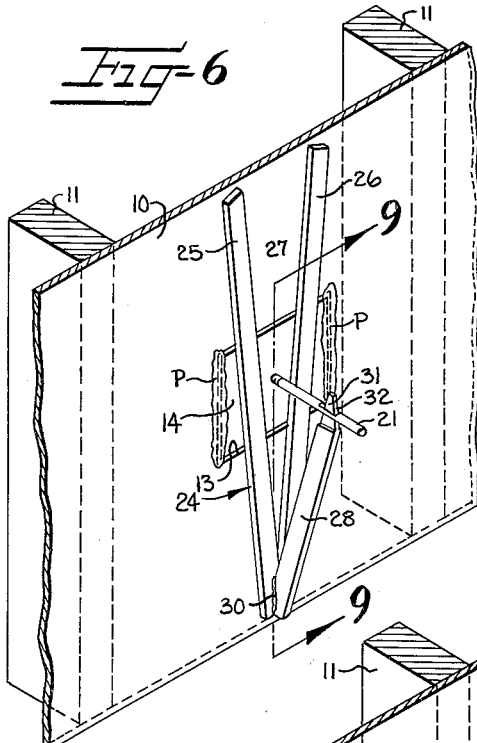
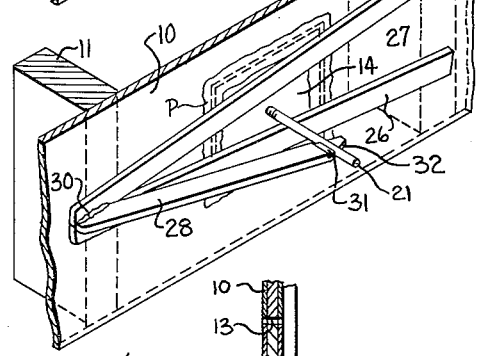
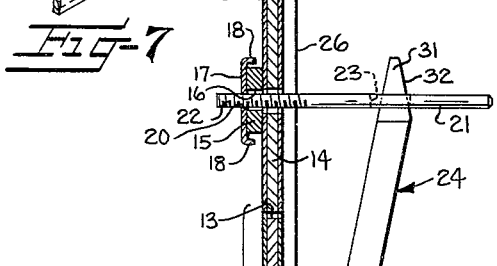
VAN WYKE H. HELTON
INVENTOR
BY Eaton, Bell, Hunt + Seltzer
ATTORNEYS
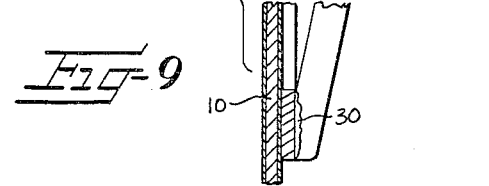

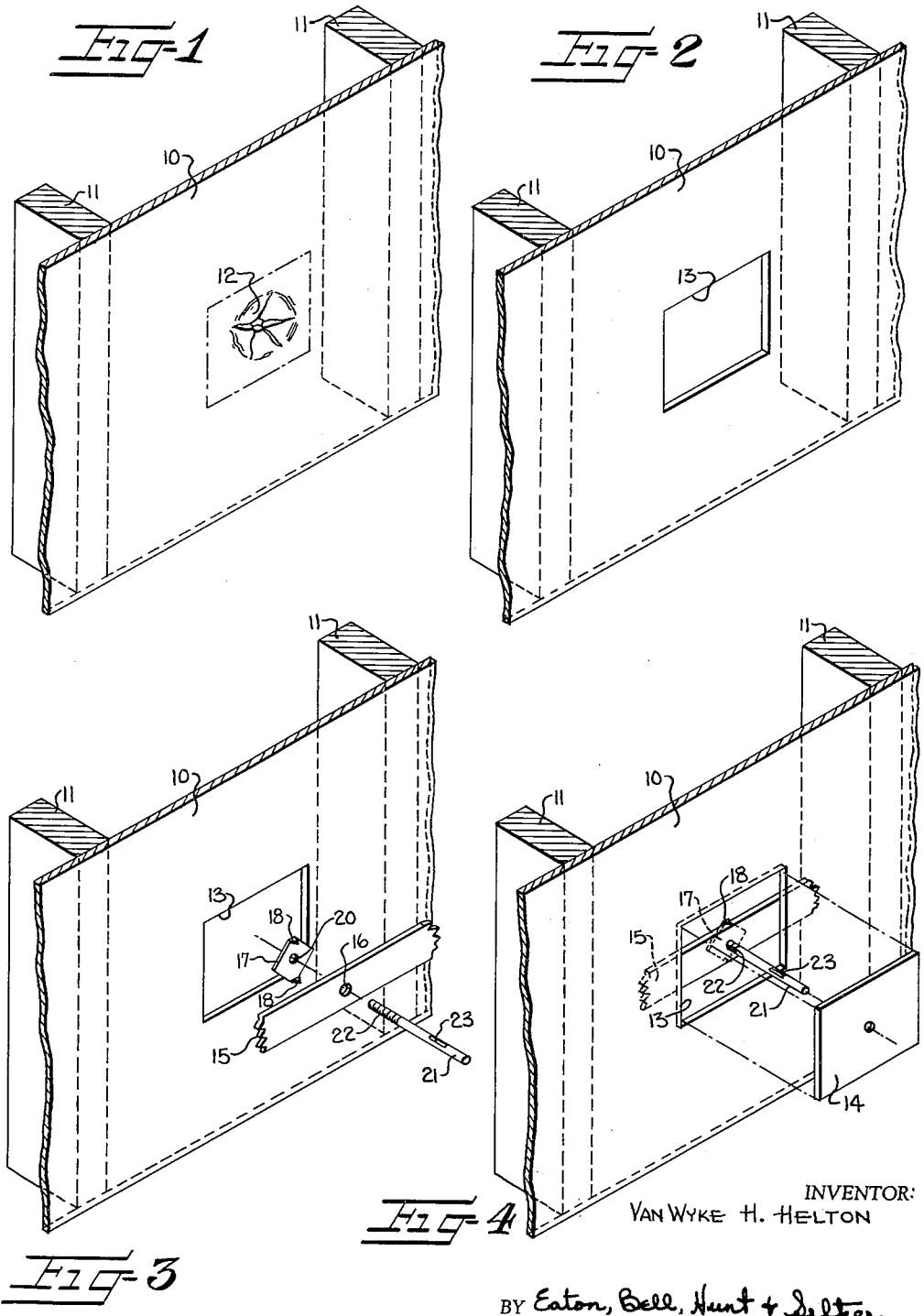

United States Patent Office 2,997,416
Patented Aug. 22, 1961

2,997,416
METHOD AND APPARATUS FOR REPAIRING WALLBOARD OR THE LIKE
Van Wyke H. Helton, Rte. 9, Concord, N.C.
Filed Mar. 14, 1958, Ser. No. 721,590
15 Claims. (Cl. 154—104)

This invention relates to a novel method and apparatus for repairing damaged areas in wallboard or the like, such as gypsum lath, sheet rock or similar material, used in the walls of buildings.

In a building wherein wallboard is employed in the construction of the walls thereof, it is frequently necessary to repair fractures, punctures, cracked portions and holes which have been accidentally or otherwise formed therein. However, it has been difficult to repair such fractures, punctures, cracked portions or holes and the like when they occur in wallboard because a fair amount of pressure must be applied to the filler material, such as plaster from the exposed surface or front side of the wallboard resulting in forcing this material through the wallboard without effecting a satisfactory repair. Moreover, the application of pressure to the damaged area of the wallboard in attempting to repair the same by plastering not infrequently causes a depressed portion in the wallboard where the damaged area was formerly located.

Attempts have been made to provide a suitable backing unit for the back side of the damaged area of wallboard to facilitate its repair. However, such attempts have not been entirely satisfactory, since it has been necessary that the entire backing unit remain in installed position behind the wallboard after the repair of the same has been effected, with the result that the backing unit could not be reused. Also, such backing units have included one or more elements which had to be positioned against a stud or other suitable means, such as the back side of the adjacent wall, in order to adequately support the unit during and after the damaged area was repaired.

It is a principal object of this invention to provide an apparatus for repairing damaged areas of wallboard or the like, wherein frame means are positioned on the front side of the wall board for positioning the portion to be repaired or the repair patch in flush relationship with the front side of the wallboard.

It is another object of this invention to provide a method and apparatus for repairing damaged areas of wallboard or the like, wherein substantially all of the parts comprising the apparatus employed in effecting a repair may be repeatedly used in making subsequent repairs, since only inconsequential parts of the apparatus are required to be expended in completing a repair.

It is another object of this invention to provide a method and apparatus for repairing damaged areas of wallboard or the like, wherein a backing plate is furnished for the back side of the wallboard across the damaged area and temporary bracing means for the backing plate are positioned exteriorly of the front side of the wallboard, thus permitting the method and apparatus to be used at any location on the wallboard regardless of the location of interior supports and without requiring the use of a backing plate of enlarged size relative to the damaged area of wallboard. In this connection, the repair patch and/or filler material would have to cover an area only as large as the damaged area, resulting in a saving of material, inasmuch as scrap wallboard material may be used as a repair patch.

It is a more specific object of this invention to provide an apparatus for repairing damaged areas of wallboard or the like, wherein the apparatus comprises a backing plate adapted to be installed across the damaged area on the back side of the wallboard, a frame having a planar levelling surface disposed across the damaged area on the front side of the wallboard, a stem operatively connected between the backing plate and the frame, and cam means effective between the frame and the stem to draw the stem outwardly with respect to the front side of the wallboard for alining a previously upset portion of the wallboard with the body of the wallboard or for clamping a repair patch in flush relation to the face of the wallboard between the backing plate and the portions of the frame defining the planar levelling surface.

It is an other more specific object of this invention to provide a method for repairing damaged areas of wallboard or the like, wherein the method involves the removal of the damaged area from the wallboard leaving a hole therein, clamping a repair patch in the hole between a backing plate disposed across the hole on the back side and a planar surface partially blocking the hole on the front side of the wallboard, and filling in the cracks between the patch and the wallboard portions bounding the hole therein with a suitable filler material, such as plaster.

Some of the objects of the invention having been stated, other objects will appear as the description proceeds, when taken in connection with the accompanying drawings, in which—

FIGURES 1 through 8 are fragmentary isometric views of a section of wallboard illustrating successive steps involved in carrying out the improved method, and wherein FIGURE 6 and 7 show the present apparatus completely assembled;

FIGURE 9 is a longitudinal sectional view taken along line 9—9 in FIGURE 6.

Referring to the drawings more specifically, there is shown a fragmentary portion of a building wall 10, such as wallboard made from gypsum lath, sheet rock or similar material. The wallboard 10 is adapted to be supported by the usual studs 11. As shown in FIGURE 1, the wallboard 10 has a damaged area 12 therein, which may be in the form of a hole, fracture, puncture or cracked portion. This invention contemplates the use of an apparatus and method for quickly and easily repairing a damaged area, such as that shown at 12, in wallboard material.

It will be noted in FIGURE 2 that the damaged area 12 of the wallboard 10 has been removed by cutting a hole or opening 13 therein. A patch of wallboard material 14 (as shown in FIGURE 4) is shaped to loosely fit the hole or opening 13 cut in the wallboard 10. Referring to FIGURES 3, 4 and 5, it will be observed that an elongated backing plate or brace 15 is adapted to be inserted through the hole 13 in the wallboard 10. The backing plate 15 is dimensioned so that it may lie across the hole 13 and engage the back side of the wallboard 10 in such a manner as to prevent its withdrawal through the hole 13.

Means are provided for holding the backing plate 15 across the hole 13 on the back side of the wallboard 10. In this connection, it will be noted that the backing plate 15 is provided with a relatively small hole or aperture 16 therein. A nut or stop element 17 is positioned against the rearwardly facing surface of the backing plate 15, and has upper and lower tabs or projections 18 thereon which are adapted to straddle and engage the upper and lower edges of the backing plate 15, respectively. The tabs or projections 18 may also take the form of teeth which are embedded in the material of the backing plate 15. The nut or stop element 17 is restrained against rotation relative to the backing plate 15 by the tabs or projections 18. A centrally positioned threaded aperture 20 is formed in the nut 17, the nut 17 being positioned on the rear surface of the backing plate 15 to bring its threaded aperture 20 into axial alinement with the aperture 16 formed in the backing plate 15.

The apertures 16, 20 are adapted to receive an elongated stem or rod 21 having a threaded end 22. It will be observed in FIGURE 9 that the threaded end 22 of the stem or rod 21 passes freely through the aperture 16 formed in the backing plate 15 while being threadably received by the aperture 20 in the nut 17. Thus, it will be apparent that the stem 21 is removably secured to the nut 17, and is freely rotatable relative to the backing plate 15 and the nut 17.

A transverse slot 23 is formed in the stem or rod 21 adjacent the opposite or outer end thereof for a purpose hereinafter described. Referring to FIGURES 6 and 7, there is shown a frame 24 having means providing a planar levelling surface thereon for positioning the repair patch 14 in flush relation to the front side of the wallboard 10. The latter-mentioned means of the frame 24 comprises a pair of struts 25, 26 presenting flat surfaces lying in a single plane and adapted to engage the front side of the wallboard 10. The pair of struts 25, 26 collectively define a V-shape, being joined at one end and diverging outwardly therefrom to provide a throat or opening 27 therebetween. A frame member 28 is connected to the pair of struts 25, 26 at the apex of the V, thereby forming a juncture 30 between the three members forming the frame 24.

The frame member 28 extends outwardly at an acute angle from the pair of struts 25, 26. On its free end, the frame member 28 has a wedge-shaped or triangular-shaped blade or cam portion 31 of reduced thickness. The blade 31 is provided with an inclined cam surface 32 and is adapted to be loosely received within the transverse slot 23 formed in the stem 21.

The operation of the apparatus in repairing the damaged area 12 in the wallboard 10 will now be described. The elongated stem 21 is initially passed through the aperture 16 in the backing plate 15 and then threaded within the aperture 20 in the nut 17 associated with the backing plate 15. The stem 21 can then be manipulated to enable the backing plate 15 to be inserted through the hole 13 and positioned across the hole 13 formed in the wallboard 10 on the back side thereof, as shown in FIGURE 4.

The repair patch 14 is suitably apertured to receive the unthreaded end of the stem 21, being pushed along the stem 21 until it has entered the hole 13 formed in the wallboard 10 as shown in FIGURE 5. The frame 24 is then disposed across the hole 13 on the front side of the wallboard 10, whereupon it will be observed that the pair of struts 25, 26 provide a planar levelling surface or surfaces for the front surface of the repair patch 14. The stem 21 is permitted to pass through the throat 27 formed between the pair of struts 25, 26, the slot 23 therein being located so as to receive the blade 31 formed on the free end of the frame member 28.

Referring more particularly to FIGURE 9, it will be observed that the inclined cam surface 32 on the blade 31 is adapted to engage one surface bounding the transverse slot 23 formed in the stem 21. Thus, it is apparent that, by imparting upward movement to the frame 24, the inclined cam surface 32 formed on the blade 31 will ride against the outer wall of the slot 23 in the stem 21, thereby drawing the stem 21 outwardly with respect to the wallboard 10. Accordingly, the backing plate 15 will be drawn against the adjacent portions of wallboard bounding the hole 13 on the back side thereof, the backing plate 15 thus serving as a bracing means for the patch 14 which is clamped between the backing plate 15 and the flat surfaces formed on the struts 25, 26.

In this manner, the patch 14 will be positioned in flush relation to the front side of the wallboard 10, and a filler material P, such as plaster or the like, may be applied between the patch 14 and the portion of the wallboard 10 bounding the hole 13 on the front side thereof. As shown in FIGURE 6, the filler material P may first be applied to the opposite sides of the patch 14 which are unobstructed by the struts 25, 26 of the frame 24. The frame 24 may then be moved through 90 degrees in either a clockwise direction (as shown in FIGURE 7) or a counterclockwise direction, so the upper and lower edges of the patch 14 will be unobstructed by the struts 25, 26. The filler material P may then be applied across the upper and lower edges of the repair patch 14 to completely seal the cracks between it and the adjacent portions of wallboard 10.

When the filler material P has been applied around the entire perimeter of the patch 14 and allowed to harden or set, the frame 24 may be removed by sliding the blade 31 out of the transverse slot 23 formed in the stem 21. It is then a simple matter to unthread the stem 21 from the threaded aperture 20 formed in the nut 17, following which the stem 21 may be withdrawn from the backing plate 15 and the repair patch 14. The aperture formed in the patch 14 for receiving the stem 21 may then be sealed with filler material P, as shown in FIGURE 8, completing the repair of the wallboard 10.

Thus, it will be seen that only the backing plate 15 and the nut 17 remain behind the wallboard 10 while the remainder of the repairing apparatus may be used again in subsequent repairs. Since the backing plate 15 may be made from nothing more than a sheet of scrap wood or metal, it is of no consequence cost-wise as its value is negligible. It is contemplated that the surface of the backing plate 15 adjacent to the back side of the wallboard 10 may be coated with a suitable adhesive or glue to assist in securing the backing plate 15 across the hole 13 on the back side of the wallboard 10.

The only other element expended in effecting the repair of the wallboard 10 is the nut 17 positioned against the rear surface of the backing plate 15. It is apparent that the aperture 16 in the backing plate 15 could be threaded to threadably receive the stem or rod 21 in which case the use of the nut 17 would not be required. The stem 21 and frame 24 may be used repeatedly to effect subsequent repairs in the wallboard 10 in contrast to other known devices for repairing such wallboard material in which substantially the entire device is expended in effecting the repair.

There may be certain instances in which it is not necessary to cut out a hole 13 including the damaged area 12 in the wallboard 10. In these instances, the backing plate 15 may be inserted through the damaged area 12 itself, the backing plate 15 being of such dimensions to lie across the damaged area 12 on the back side of the wallboard 10. When this condition attains, it is not necessary to utilize a repair patch 14, since the damaged area 12 can be restored to flush relationship with the front side of the wallboard 10 by the use of the frame 24 which is operatively connected to the backing plate 15 by the stem 21 as previously described. To complete the repair, a filler material P, such as plaster or the like, is used to seal the cracks in the damaged area 12, following which the stem 21 may be withdrawn, and the hole made in the damaged area 12 by the insertion of the backing plate 15 therethrough may likewise be sealed. The filler material P when allowed to harden or set acts to reinforce the damaged area 12 making the use of a repair patch 14 in this instance unnecessary.

Although the frame of the repair implement is shown as being of generally V-shaped configuration, it is contemplated that the frame 24, comprising elements 25, 26 and 28, may be made of a single piece of material, such as metal, bent to the desired shape, without departing from the spirit of the invention. Also, the frame 24 may be of tear-drop or delta form, the primary requisite being to provide a lightweight portable frame with alined planar surfaces defining an opening therebetween to facilitate application of a sealing agent or mastic filler to the surface being repaired.

Thus, it will be seen that I have disclosed a method and apparatus for repairing wallboard or the like in which means are provided for maintaining the repaired portion in flush relationship with the front side of the wallboard and only negligible parts of the apparatus are expended in effecting a single repair, thereby allowing the apparatus to be used repeatedly in practicing the method.

In the drawings and specification, there has been set forth a preferred embodiment of the invention and, although specific terms are employed, they are used in a generic and descriptive sense only and not for purposes of limitation, the scope of the invention being defined in the claims.

I claim:

1. Apparatus for repairing a damaged area in wallboard, comprising a backing plate, a stem secured at one end to said backing plate, a frame operatively connected to said stem, said frame comprising a pair of struts joined at one end, said struts presenting flat surfaces lying in a single plane remote from the point of connection between said frame and said stem, said flat surfaces facing said backing plate, and means to draw said stem in a direction moving said backing plate closer to said flat surfaces.

2. Apparatus for repairing a damaged area in wallboard, comprising a backing plate, a stem secured at one end to said backing plate, a frame comprising means providing a levelling surface facing said backing plate and a frame member having an inclined cam surface formed on one end thereof remote from said levelling surface, said stem being provided with a slot therein receiving the end of said frame member having the inclined cam surface, and said stem being responsive to transverse movement of said inclined cam surface, against an opposed surface bounding the slot in said stem, to be drawn in a direction moving said backing plate closer to said levelling surface.

3. Apparatus for repairing a damaged area in wallboard, comprising, a frame having means presenting spaced flat surfaces lying in a single plane, said flat surfaces defining a throat therebetween, a stem extending through said throat, a backing plate secured to one end of said stem and facing said flat surfaces, and said frame having means thereon operatively connecting the same to said stem at a point remote from said backing plate for drawing said stem in a direction moving said backing plate closer to said flat surfaces.

4. Apparatus for repairing a damaged area in wallboard, comprising a frame having means presenting flat surfaces lying in a single plane, said flat surfaces defining a throat therebetween, a stem extending through said throat, a backing plate secured to one end of said stem and facing said flat surfaces, said frame having a member provided with an inclined cam surface on one end thereof, said stem having a slot therein at a point remote from said backing plate, said one end of said member being received within the slot in said stem, and said stem being responsive to transverse movement of said inclined cam surface against an opposed surface bounding the slot in said stem to be drawn in a direction moving said backing plate closer to said flat surfaces.

5. Apparatus for repairing wallboard having a hole therein, comprising a backing plate adapted to be disposed in alinement with the hole in the wallboard on the back side thereof, a stem secured at one end to said backing plate and adapted to extend outwardly therefrom through the hole in the wallboard, a frame operatively connected to said stem at a point spaced outwardly from the front side of the wallboard, said frame having means providing a levelling surface adapted to extend across and partially close the hole in the wallboard on the front side thereof, said levelling surface being of sufficient size to overlap and engage portions of the wallboard adjacent to the hole therein, and means to draw said stem outwardly with respect to the wallboard, whereby said backing plate may be moved closer to said levelling surface for positioning a repair patch of wallboard material adapted to be inserted in the hole and sandwiched between said backing plate and said levelling surface in flush relation to the front side of the wallboard.

6. Apparatus for repairing wallboard having a hole therein, comprising a backing plate adapted to be disposed across the hole in the wallboard on the back side thereof and being of sufficient size to prevent its withdrawal through the hole when positioned in a predetermined manner with respect thereto, a stem secured at one end to said backing plate and adapted to extend outwardly therefrom through the hole in the wallboard, a frame operatively connected to said stem at a point spaced outwardly from the front side of the wallboard, said frame having means providing a levelling surface adapted to extend across the hole in the wallboard on the front side thereof, said levelling surface being of sufficient size to overlap and engage portions of the wallboard adjacent to the hole therein, and means to draw said stem outwardly with respect to the wallboard, whereby said backing plate may be moved into engagement with portions of the wallboard on the back side thereof adjacent to the hole for positioning a repair patch of wallboard material adapted to be inserted in the hole and sandwiched between said backing plate and said levelling surface in flush relation to the front side of the wallboard.

7. Apparatus for repairing wallboard having a hole therein, comprising a backing plate adapted to be disposed across the hole in the wallboard on the back side thereof and being of sufficient size to prevent its withdrawal through the hole when positioned in a predetermined manner with respect thereto, a stem secured at one end to said backing plate and adapted to extend outwardly therefrom through the hole in the wallboard, a frame comprising a pair of struts joined at one end, said struts presenting flat surfaces lying in a single plane and being adapted to extend across the hole in the wallboard on the front side thereof, each of said flat surfaces being of sufficient size to overlap and engage portions of the wallboard adjacent to the hole therein, a frame member having an inclined cam surface formed on one end thereof remote from said flat surfaces, said stem being provided with a slot therein receiving the end of said frame member having the inclined cam surface, and said stem being responsive to transverse movement of said inclined cam surface against an opposed surface bounding the slot in said stem to be drawn outwardly with respect to the wallboard, whereby said backing plate may be moved into engagement with portions of the wallboard on the back side thereof adjacent to the hole for positioning a repair patch of wallboard material adapted to be inserted in the hole and sandwiched between said backing plate and the flat surfaces on said pair of struts in flush relation to the front side of the wallboard.

8. A method of repairing a damaged area in wallboard, comprising the steps of: removing the damaged area of wallboard leaving a hole therein, inserting a backing plate through the hole of sufficient size to prevent its withdrawal through the hole when positioned in a predetermined manner on the back side of the wallboard with respect to the hole, inserting a repair patch of wallboard material in the hole, positioning the front surface of the patch flush with respect to the adjacent portions of wallboard bounding the hole on the front side thereof, and plastering between the patch and the portions of wallboard bounding the hole on the front side thereof.

9. A method of repairing a damaged area in wallboard, comprising the steps of: cutting out a section of wallboard including the damaged area leaving a hole therein, inserting a backing plate through the hole of sufficient size to prevent its withdrawal through the hole when positioned in a predetermined manner on the back side of the wallboard with respect to the hole, inserting a repair patch of wallboard material in the hole, drawing the front surface of the patch into flush relationship with respect to the adjacent portions of wallboard bounding the hole on the front side thereof, and plastering between the patch and the portions of wallboard bounding the hole on the front side thereof while maintaining the front surface of the patch in flush relationship therewith.

10. A method of repairing a damaged area in wallboard, comprising the steps of: removing the damaged area of wallboard leaving a hole therein, inserting a backing plate through the hole of sufficient size to prevent its withdrawal through the hole when positioned in a predetermined manner on the back side of the wallboard with respect to the hole, inserting a repair patch of wallboard material in the hole, partially blocking the entrance to the hole from the front side of the wallboard with a planar surface, clamping the patch in the hole between the backing plate and the planar surface to position its front surface flush with respect to the front side of the wallboard, and plastering between the patch and the portions of wallboard bounding the hole on the front side thereof.

11. A method of repairing a damaged area in wallboard, comprising the steps of: removing the damaged area of wallboard leaving a hole therein, inserting a backing plate through the hole of sufficient size to prevent its withdrawal through the hole when positioned in a predetermined manner on the back side of the wallboard with respect to the hole, inserting a repair patch of wallboard material in the hole, partially blocking the entrance to the hole from the front side of the wallboard with a planar surface, drawing the backing plate against adjacent portions of wallboard bounding the hole on the back side thereof whereby the patch is moved against the planar surface to position its front surface flush with respect to the front side of the wallboard, and plastering between the patch and the portions of wallboard bounding the hole on the front side thereof.

12. A method of repairing a damaged perforate area in wallboard which includes cutting around the area to form a large opening thereat, placing an elongated backing plate against one side of the wallboard so it extends across said opening, placing a repair patch, of substantially the size and shape of said opening, in the opening and against the backing plate, establishing a mechanical connection between the backing plate and an open frame, manipulating said connection to clamp the planar surface of the open frame against the other side of the wallboard and against the surface of the patch opposite the backing plate, and then applying a mastic between the perimeter of the patch and the walls of said opening.

13. The method of claim 12 including the additional step of shifting the open frame relative to the patch and wallboard to expose areas previously covered by the open frame, and then applying mastic between the patch and the wallboard at the exposed areas.

14. Apparatus for repairing a damaged area in wallboard, comprising a backing plate, a stem secured at one end to said backing plate, a frame comprising a pair of struts having an open throat therebetween, said stem extending through said open throat and being operatively connected to said frame, said struts defining levelling means facing said backing plate in spaced opposed relationship, and means to induce relative movement between said stem and said frame for bringing said backing plate and said levelling means defined by said struts closer together.

15. A method of repairing a cracked portion in wallboard, comprising the steps of: inserting a backing plate of sufficient size through the cracked portion to prevent the withdrawal of the backing plate through the cracked portion when positioned in a predetermined manner on the back side of the wallboard with respect to the cracked portion, establishing a mechanical connection between the backing plate and a levelling member having a surface partially covering the cracked portion from the front side of the wallboard and extending across wallboard portions adjacent the cracked portion, manipulating the connection to clamp the cracked portion between the backing plate and the levelling member with the front surface of the cracked portion being flush with respect to the front side of the wallboard, plastering the cracked portion sufficiently to close the hole therein created by the insertion of the backing plate and to seal the cracks, and releasing the connection between the backing plate and the levelling member for removing the levelling member from the repaired cracked portion.

References Cited in the file of this patent

UNITED STATES PATENTS

| | | |
|---|---|---|
| 1,689,705 | Walker | Oct. 30, 1928 |
| 2,336,704 | Skoog | Dec. 14, 1943 |
| 2,512,469 | Poss | June 20, 1950 |
| 2,598,194 | Shippey | May 27, 1952 |
| 2,638,774 | Wieman | May 19, 1953 |
| 2,675,837 | Mann | Apr. 20, 1954 |